United States Patent [19]
Fairbanks

[11] Patent Number: 4,557,040
[45] Date of Patent: Dec. 10, 1985

[54] ALIGNMENT AND INSERTION APPARATUS FOR AN INFORMATION-CONTAINING DISC STYLUS

[75] Inventor: David W. Fairbanks, So. Brunswick Twp., Middlesex County, N.J.

[73] Assignee: RCA Corporation, Princeton, N.J.

[21] Appl. No.: 602,156

[22] Filed: Apr. 19, 1984

[51] Int. Cl.[4] .................... B23P 21/00; B23Q 15/00; B23Q 7/10

[52] U.S. Cl. ....................... 29/720; 29/728; 29/792; 29/811; 29/822; 414/223; 414/225; 901/47

[58] Field of Search ............... 29/700, 720, 721, 728, 29/791, 792, 809, 811, 822, 283; 414/223, 225, 226; 369/161, 170; 445/4, 64; 116/201, 202; 901/6, 7, 8, 47

[56] References Cited

U.S. PATENT DOCUMENTS

| | | | |
|---|---|---|---|
| 739,303 | 9/1903 | Gleason | 369/161 |
| 816,908 | 4/1906 | Gaynor | 369/161 |
| 1,358,157 | 11/1920 | Jones | 369/161 |
| 2,980,266 | 4/1961 | Boros | 414/226 |
| 3,194,626 | 7/1965 | Hoffmann | 445/4 |
| 3,824,666 | 7/1974 | Roodvoets et al. | 29/720 X |
| 3,932,931 | 1/1976 | Wright | 29/720 X |
| 4,190,890 | 2/1980 | Marx | 29/720 X |
| 4,396,945 | 8/1983 | DiMatteo et al. | 901/47 X |

FOREIGN PATENT DOCUMENTS

| | | | |
|---|---|---|---|
| 10226 | 4/1980 | European Pat. Off. | 414/223 |
| 66060 | 12/1982 | European Pat. Off. | 29/721 |

Primary Examiner—Howard N. Goldberg
Assistant Examiner—Ronald S. Wallace
Attorney, Agent, or Firm—Birgit E. Morris; Donald S. Cohen; James M. Trygg

[57] ABSTRACT

An apparatus for accurately aligning an information-containing-disc stylus and assembling the stylus to a stylus holder. The apparatus transfers the stylus from a magazine holding a plurality of such styli into a rotary collet which is then rotated by an operator until a laser beam of light is reflected off a known surface of the stylus and impinges on a fixed target. The apparatus then causes the point of the stylus to pierce the stylus holder to a specific depth whereby the stylus is held firmly by the stylus holder.

10 Claims, 10 Drawing Figures

ALIGNMENT AND INSERTION APPARATUS FOR AN INFORMATION-CONTAINING DISC STYLUS

This invention relates to apparatus for aligning and assembling small parts and more particularly to alignment of an information-containing-disc stylus and assembly of the stylus to the stylus holder.

BACKGROUND OF THE INVENTION

Audio and video playback systems of the type using an information-containing-disc having recorded information signals encoded into a fine spiral groove typically utilize a stylus to read the encoded information signals. Included in such systems are the capacitive playback systems, wherein the stylus dielectric material is coated on at least one surface with a conductive metal layer which interacts with the conductive disc to read the information encoded thereon. An example of such a system is disclosed in U.S. Pat. No. 3,842,194 issued Oct. 15, 1974 to Clemens. Clemens discloses a video disc having a playback system utilizing variable capacitance. In one configuration of the Clemens system, information representative of recorded picture and sound is encoded in the form of a relief pattern in a relatively fine spiral groove on the surface of the disc. For example, groove widths of about 2.5 micrometers and groove depths of about 1.0 micrometer may be used. During playback a pickup stylus having a shoe width of 2.0 micrometers and a thin conductive electrode formed thereon, for example about 0.2 micrometers thick, engages the groove as the record is rotated by a supportive turntable. Capacitive variations between the stylus electrode and the disc surface are sensed to recover the pre-recorded information. In systems of the above type, the use of a relatively fine record groove and the requirements for a groove engaging pickup stylus result in a stylus tip which is extremely small.

During the manufacturing of cartridges containing such styli, the finished stylus is assembled to a stylus holder comprising an elongated tube. One end of the tube has attached thereto a plastic portion through which the stylus is inserted. The shoe and electrode of the stylus must be precisely aligned with respect to the longitudinal axis of the tube. The procedures required to accomplish this are complex and time consuming when using conventional tooling and require a highly skilled operator to achieve an acceptible level of repeatability. The present invention, however, through the use of novel mechanisms, permits an operator of less skill to very rapidly assemble the stylus to the tube while significantly reducing the incidence of failure due to operator error.

SUMMARY OF THE INVENTION

According to the present invention there is shown an apparatus for aligning and inserting an information-containing-disc stylus into a stylus holder. The apparatus comprises a frame, a holder positioning means for positioning the stylus holder with respect to the frame, and a stylus positioning means for positioning the stylus with respect to the stylus holder. A loading means is included for inserting the stylus into the stylus positioning means and an inserting means is included for inserting the stylus into the stylus holder.

DESCRIPTION OF THE PREFERRED EMBODIMENT

Figure 1:
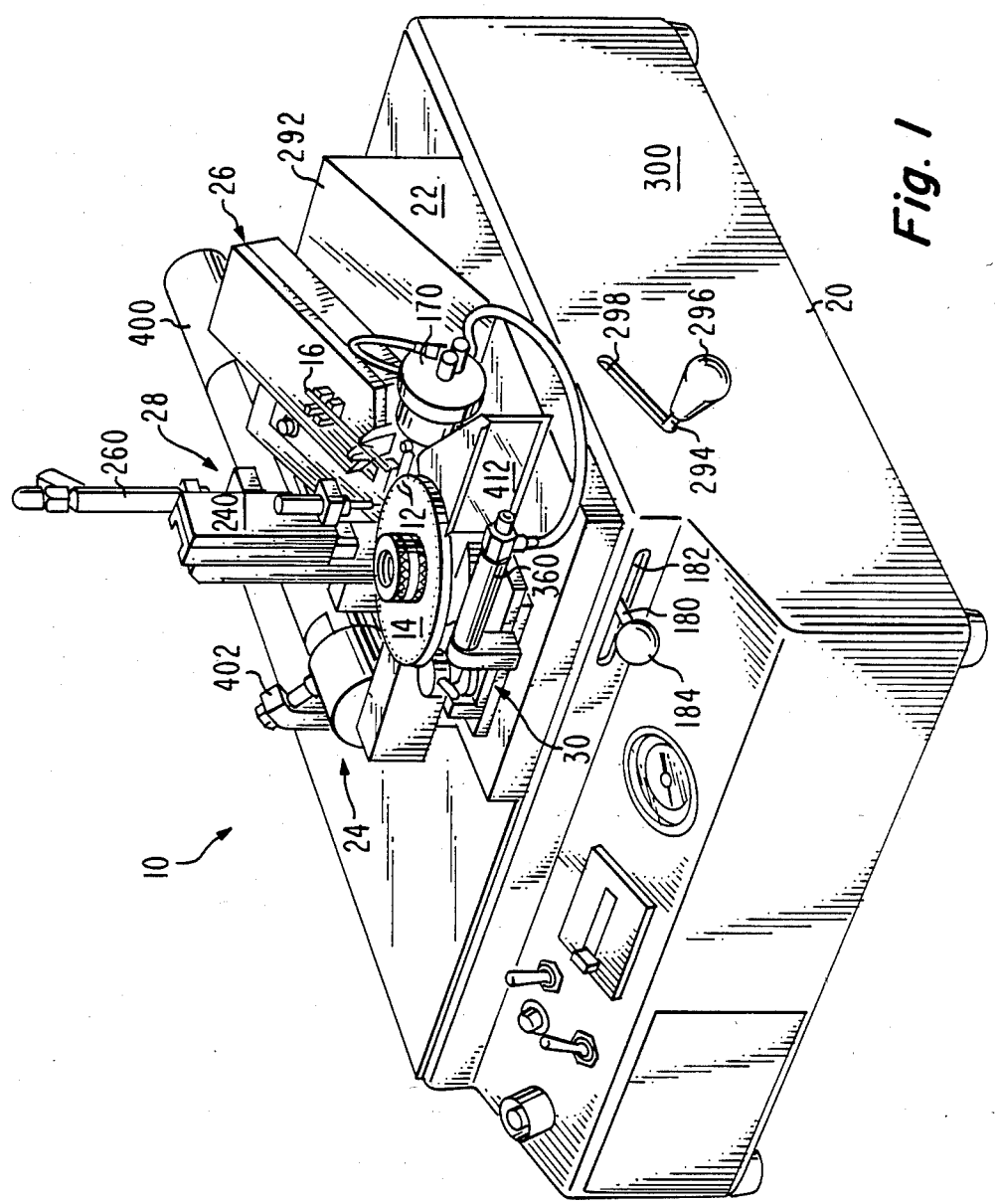
FIG. 1 is an isometric view of the alignment and insertion apparatus embodying the teachings of the present invention.

FIGS. 1 through 6 show a stylus insertion machine 10 for inserting styli 12, contained in a circular magazine 14, into a stylus holder tube 16. The stylus insertion machine 10 includes a base 20 and a mounting plate 22 having a laser assembly 24, a stylus holder positioning assembly 26, and a stylus pusher assembly 28 secured thereto. An indexing mechanism 30 is secured to the mounting plate 22 for selectively positioning each stylus 12, in seriatim, under and in vertical alignment with a push rod 32 of the stylus pusher assembly 28. A rotary collet assembly 40 is arranged to receive the stylus 12 as it is pushed out of the magazine 12 by the push rod 32 as shown in FIG. 5b.

Figure 3:
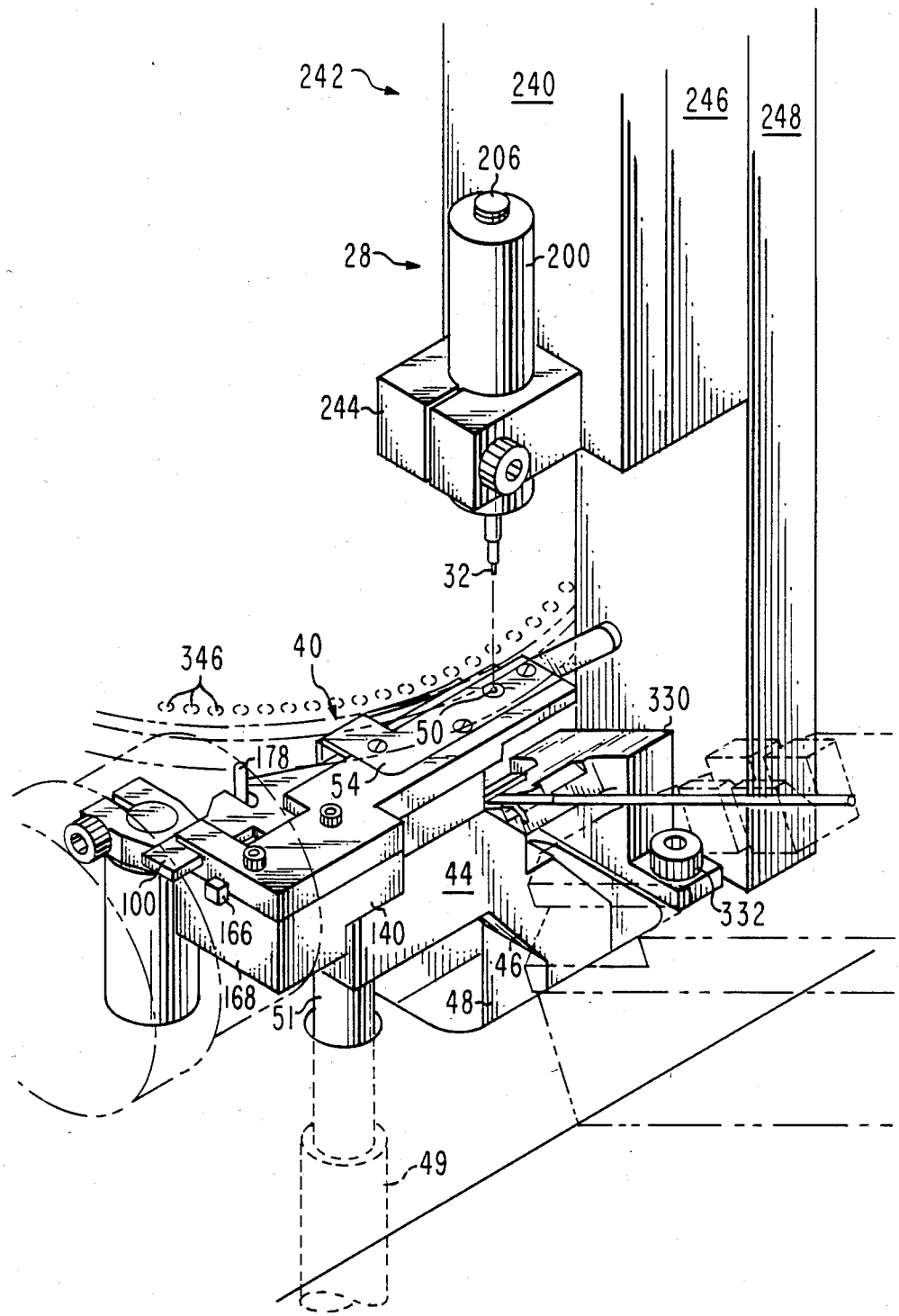
FIG. 3 is an isometric view of a portion of the apparatus shown in FIG. 2 taken along the lines 3—3.

The rotary collet assembly 40, as best seen in FIG. 3, is attached to an end 44 of an angled bracket 46. The other end 48 of the bracket 46 is associated with a slide mechanism, not shown, that permits vertical movement of the bracket 46 with respect to the mounting plate 22. The purpose of the vertical movement will be disclosed below. Any suitable, commercially available, slide mechansim may be used wherein the movable member is attached to the bracket 46 and the stationery member is attached to the mounting plate 22 in a manner that is well known in the art. An air cylinder 49, attached to the under surface of the mounting plate 22 has a push rod 51 that abuts the underside of the end 44 and is arranged so that when energized, the bracket 46 and the rotary collet assembly 40 are caused to move upwardly to the position indicated at B in FIG. 6. When the air cylinder 49 is de-energized the push rod 51 retracts and a spring, not shown, causes the bracket 46 and the rotary collet assembly 40 to move downwardly to the position indicated at A in FIG. 6.

Figure 4:
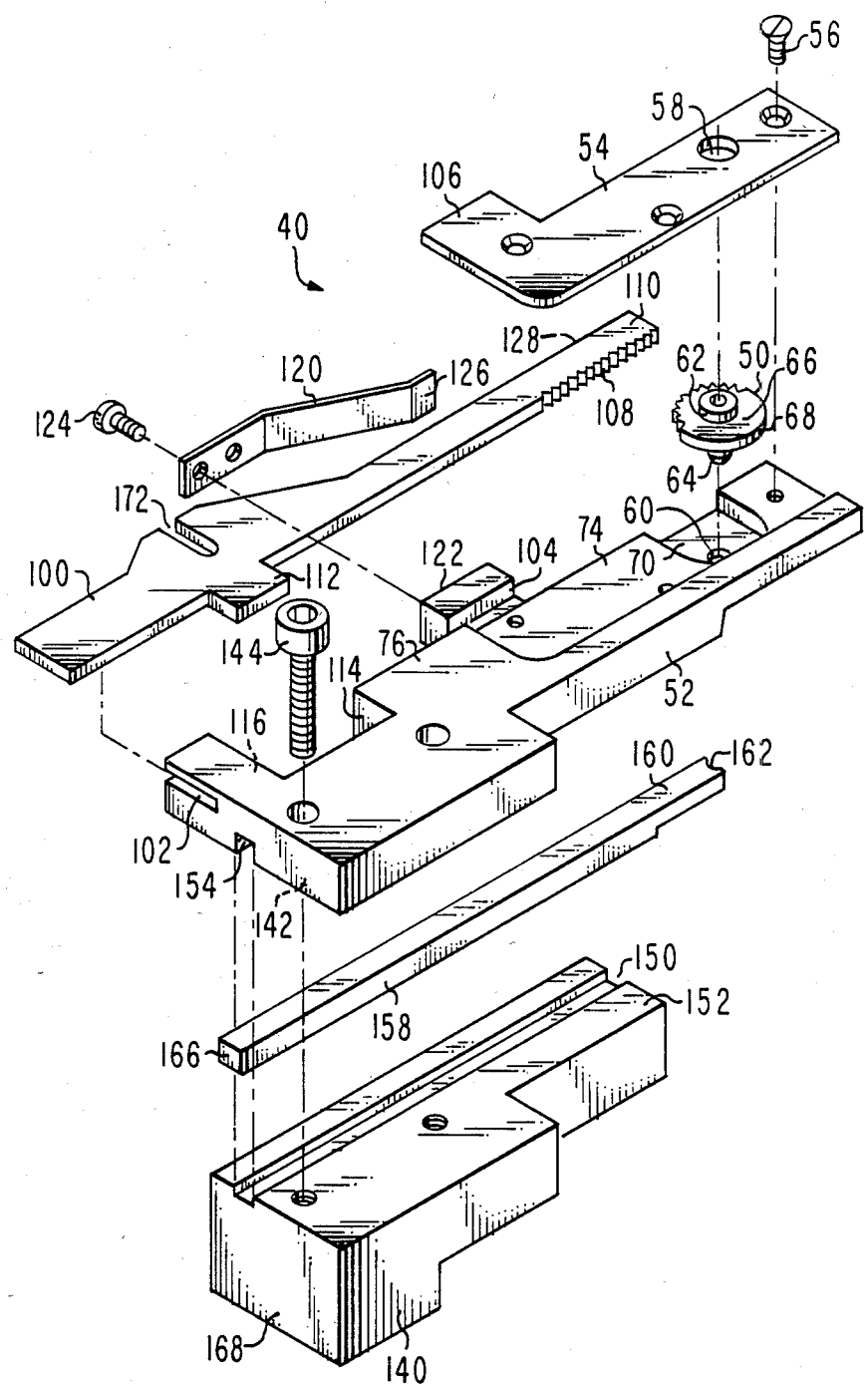
FIG. 4 is an exploded parts view of the rotary collet assembly 40.
Figure 6:
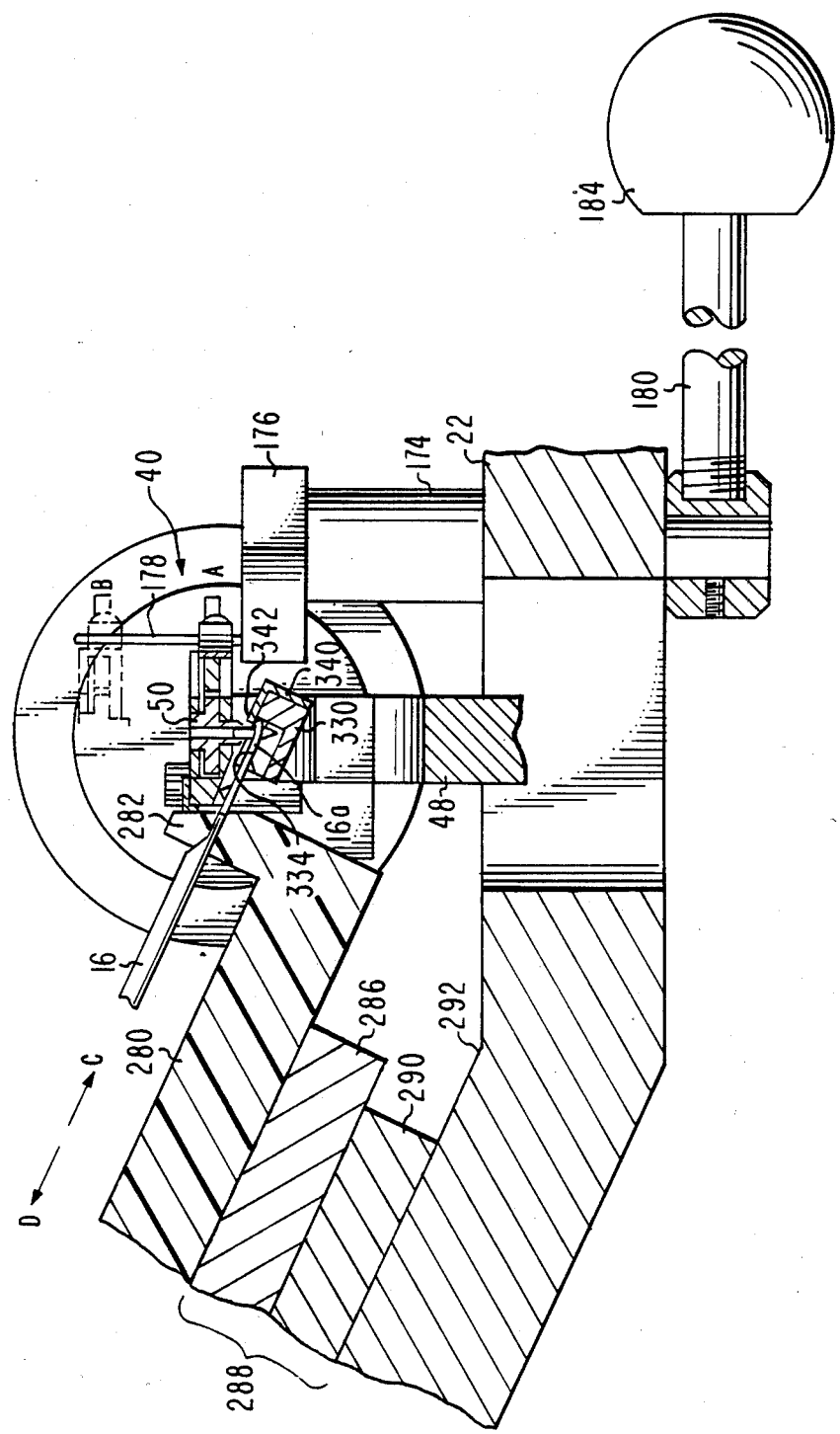
FIG. 6 is a partial cross sectional view taken along the lines 6—6 in FIG. 2.
Figure 7:
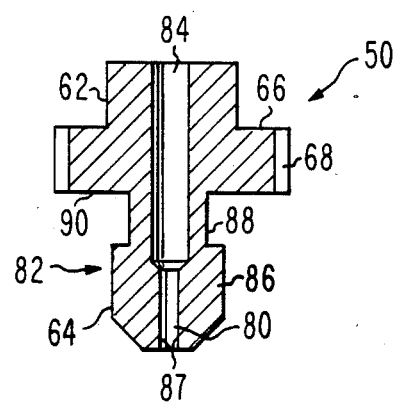
FIG. 7 is an enlarged cross sectional view of the collet shown in FIG. 6.

As shown in FIGS. 3, 4 and 6 the rotary collet assembly 40 includes a collet 50, a base plate 52, and a cover 54 which is attached to the base plate 52 by suitable screw fasteners 56. A hole 58 formed in the cover 54 and a hole 60 formed in the base plate 52 are arranged coaxial. The collet 50 comprises a pair of diameters 62 and 64 separated by a flange 66 having gear teeth 68 formed in its periphery. A cavity 70 is formed in the base plate 52 and has a height slightly greater than the thickness of the flange 66 of the collet 50 and a width greater than the outside diameter of the flange. The diameter 62 of the collet 50 is sized to have a slip fit within the hole 58 of the cover 54 and the diameter 64 of the collet 50 is sized to have a slip fit within the hole 60 of the base plate 52. A recess 74 is formed in the surface 76 of the base plate 52 for accepting the cover 54 so that the cover will be flush with the surface 76 when attached to the base plate 52. The collet 50 is arranged within the cavity 70 with the pair of diameters 62 and 64 projecting into the holes 58 and 60 respectively so that the collet is free to rotate. As best seen in FIG. 7, a central hole 80 having a diameter of 11.5 mils is formed axially through an end 82 of the collet 50. A clearance counterbore 84 is formed in the other end of the collet as shown in FIG. 7. Three equally spaced slots 86 are arranged in the end 82 thereby forming three jaws 87. An undercut 88 formed in the diameter 64 adjacent the surface 90 of the flange 66 defines a resilient portion which provides a small amount of resiliency to the individual jaws 87. The hole 80 is slightly smaller than the outside diameter of the stylus 12, thus, when a stylus 12 is inserted into the hole 80, the jaws 87 will be urged apart a slight amount, in opposition to the resilient portion thereby gripping the stylus. The hole 60 of the base plate 52 is sized so that the collet 50 is free to rotate with the stylus 12 inserted and held by the jaws. The collet assembly 40 is positioned so that the hole 80 is under and in vertical alignment with the push rod 32 of the stylus pusher assembly 28.

An elongated slide plate 100 is arranged to slide in a longitudinal direction within a pair of slots 102 and 104 formed in the base plate 52 as shown in FIG. 4. The slot 104 is enclosed by a tab 106 projecting from the cover 54. A rack gear 108 is formed in the end 110 of the slide plate 100 and is arranged to operationally engage the gear teeth 68 of the collet 50. As the slide plate 100 is caused to move within the slots 102 and 104, the collet 50 is thereby caused to rotate an amount that is proportional to the amount of movement of the slide plate. This movement of the slide plate 100 is limited by a stop tab 112 which will abutt against either a surface 114 or a surface 116, each of which is formed in the base plate 52 as shown in FIG. 4. A flat leaf spring 120, or similar resilient member, is attached to the base plate 52 at 122 by suitable screw fasteners 124. The leaf spring 120 is arranged so that its end 126 pressingly engages the surface 128 of the end 110 thereby maintaining the rack gear 108 in operational engagement with the gear teeth 68 of the collet 50. A sole plate 140 is attached to the undersurface 142 of the base plate 52 with suitable screw fasteners 144 as shown in FIG. 4. A longitudinal slot 150 is formed in the upper surface 152 of the sole plate 140 and a corresponding slot 15 is formed in the undersurface 142 of the base plate 52. The slot 154 intersects the hole 60. An elongated brake rod 158 having a rectangular cross section is sized to slide within the cavity formed by the two slots 150 and 154 without appreciable side play. An end 160 of the brake rod 158 has a concave portion 162 having a radius that is exactly equal to the radius of the hole 60 and in alignment therewith. The concave position 162 may be formed by boring through the base plate 52 and the brake rod 158 in a single continuous machining operation while the brake rod is clamped in position within the slot 154. The length of the brake rod 158 is chosen so that when the concave portion 162 is in alignment with the hole 60, the end 166 projects out of the slots 150, 154 a fixed distance from an end surface 168 of the sole plate 140, as is best seen in FIG. 3.

An air cylinder 170 is attached to the end surface 168 of the sole plate 140 by any suitable means. The air cylinder 170 is arranged so that upon activation thereof, pressure is applied to the end 166 of the brake rod 158 in a direction toward the hole 60. This causes the concave portion 162 to pressingly engage the diameter 64 of the collet 50, as shown in FIG. 5b, thereby inhibiting rotation of the collet. Upon deactivation of the air cylinder 170, the pressure on the end 166 is removed thereby permitting free rotation of the collet 50. The slide plate 100 contains an open ended slot 172 positioned opposite the stop tab 112 and having a longitudinal axis substantially perpendicular to the rack gear 108. A shaft 174 is pivotally attached to the mounting plate 22 and has a crank arm 176 rigidly attached to its upper extremity as shown in FIG. 6. A pin 178, projecting upwardly from the crank arm 176, is arranged off center from the pivotal axis of the shaft 174 and projects through the slot 172 in the slide plate 100. The diameter of the pin 178 is slightly smaller than the width of the slot 172. Further, the pin 178 is of sufficient height that the rotary collet assembly 40 may undergo vertical movement as indicated by the two positions shown at A and B in FIG. 6 without the pin 178 disengaging the slot 172. An actuating arm 180 is rigidly attached to the end of the shaft 174 opposite the crank arm 176. The actuating arm 180, projecting through an opening 182 formed in the base 20, has a suitable handle or knob 184 attached to its extremity for manual manipulation.

By manipulation of the knob 184, the shaft 174 is caused to pivot within the limits permitted by the opening 182. As the shaft 174 pivots, the pin 178 also pivots about the axis of the shaft 174. As the pin 178 is pivoted, it remains within the confines of the slot 172 and the slide plate 100 will undergo movement in its longitudinal direction thereby rotating the collet 50. In this way an operator, by a simple manipulation of the knob 184, can rotate the collet 50 a fixed amount in each direction.

The stylus pusher assembly 28 includes a housing 200 having an internal bore 202 and a sleeve 204 having an outside diameter 203 sized to permit free sliding movement of the sleeve 204 within the bore 202. A set screw 206 is threaded into the end 208 of the housing 200, as shown in FIGS. 5a and 5b and serves to limit upward movement of the sleeve 204. An axial through hole 210 and counterbore 212 are formed in the sleeve 200 concentric to the outside diameter 203. The push rod 32 has one end disposed within the hole 210 and securely held in place by a set screw 214 which is threaded into the sleeve 204, as shown in FIGS. 5a and 5b. An end plate 220 is staked in the end 222 of the housing 200 and has a bore 224 formed therein in alignment with and having a diameter substantially the same as the counterbore 212. A push rod support sleeve 230 is disposed within the bore 224 and the counterbore 212 and is in sliding engagement therewith. A collar 232 is attached to the support sleeve 230 intermediate its two ends and serves to abut the end plate 220 thereby limiting downward movement of the support sleeve 230, as viewed in FIG. 5a. A helical compression spring 234 is disposed around the support sleeve 230 and is arranged to urge the sleeve 204 upwardly against the set screw 206 and the collar 232 downwardly against the end plate 220, as shown in FIG. 5a. A lower portion 236 of the sleeve 230, has a diameter slightly smaller than the diameter of the sleeve 230, as best seen in FIG. 5a, for a purpose that will be described below. The longitudinal axis of the push rod 32 is coincident with the longitudinal axis of the two sleeves 203, 230 and the housing 200.

The stylus pusher assembly 28 is attached to a movable member 240 of a slide 242 by means of a suitable clamp 244. A stationary member 246 of the slide 242 is attached to the mounting plate 22 by means of a bracket 248. Suitable mounting hardware, not shown, may be used for this attachment. The slide 242 may be one of any smooth acting linear slides that are presently commercially available and that have sufficient travel.

An air cylinder 260 is attached to the bracket 248 and arranged so that when activated, the movable member 240 is caused to move downwardly, as viewed in FIGS. 1 and 3. The movement is such that the push rod 32 traverses a line that is coincident with its longitudinal axis and projects into the hole 80 of the collet 50. When the air cylinder is de-energized, the movable member 240 will move upwardly, returning to its original position. The amount of upward and downward movement is controlled by adjusting stops, not shown, the construction of which is well known in the art and therefore will not be described here.

Figure 2:
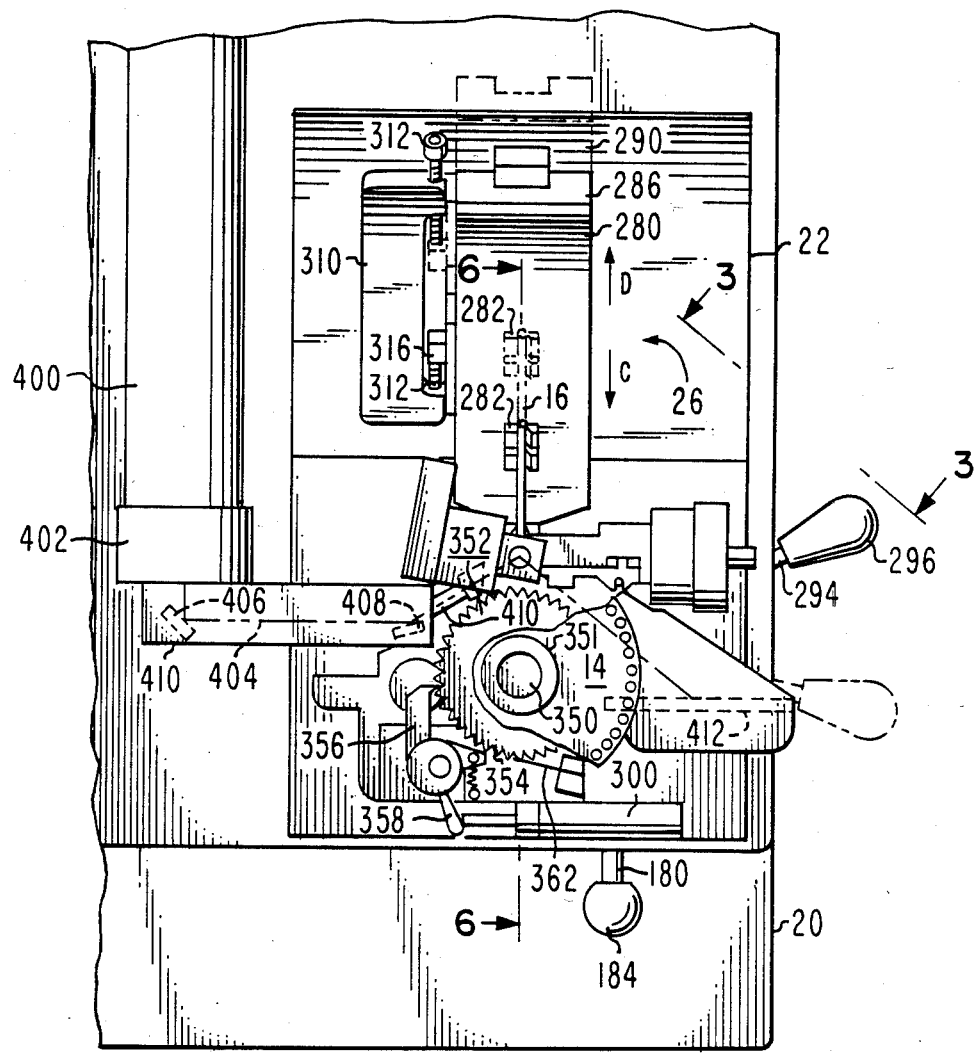
FIG. 2 is a top view of a portion of the apparatus shown in FIG. 1.

The stylus holder positioning assembly 26, as shown in FIGS. 1 and 2 includes a fixture plate 280 having a pair of V blocks 282 attached thereto and arranged for receiving the stylus holder tube 16 within the V's. A suitable clamping means, not shown, retains the tube 284 in this position. The fixture plate 280 is attached to a movable member 286 of a suitable slide mechanism 288. The stationary member 290 of the slide mechanism 288 is attached to an inclined surface 292 of the mounting plate 22. An actuating arm 294 and knob 296 project outwardly of a slot 298 formed in the side panel 300 of the base 20, as best seen in FIG. 1. The actuating arm 294 operates a linkage mechanism, not shown, that is arranged to cause the movable member 286 of the slide 288 to move back and forth in the directions indicated by the arrows C and D in FIGS. 2 and 6, when the operator manipulates the arm 294. There are a variety of such linkage mechanisms known in the art which would be suitable for this purpose and therefore will not be described here. Additionally, the slide 288 may be any suitable commercially available slide. An adjustable stop 310, having a pair of opposing set screws 312, is attached to the inclined surface 292 adjacent the slide 288, as shown in FIGS. 1 and 2. A tab 316 attached to the fixture plate 280 is aranged to abut these set screws 312 thereby limiting the back and forth movement of the movable member 286. A suitable detent mechanism, not shown, is used to retain the movable member 286 in its two extreme positions with the tab 316 firmly abutting one of the set screws 312.

Figure 8:
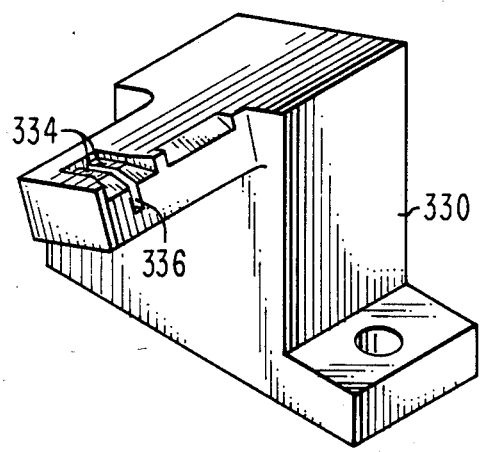
FIG. 8 is an isometric view of the anvil shown in FIG. 3.

An anvil 330 is attached to the mounting plate 22, as shown in FIG. 3, with the screw fasteners 332. The anvil 330 includes a seat 334 having a clearance slot 336 formed therein, as best seen in FIG. 8. The anvil 330 is positioned so that when the movable member 280 of the slide 288 is moved to its most forward position, in the direction indicated by the arrow C, the tip 16a of the stylus holder tube 16 rests upon the seat 334, as shown in FIG. 6. A stripper plate 340, in the form of an angle, is attached to the anvil 330 as shown in FIG. 6. An edge 342 of the stripper plate 340 overhangs the seat 334 sufficiently so that after a stylus 14 is inserted into the end 16a of the stylus holder tube 16, the end 16a will be retained on the seat 334 by the edge 342 when the rotary collet assembly 40 is raised to the position indicated at B in FIG. 6.

Figure 5C:
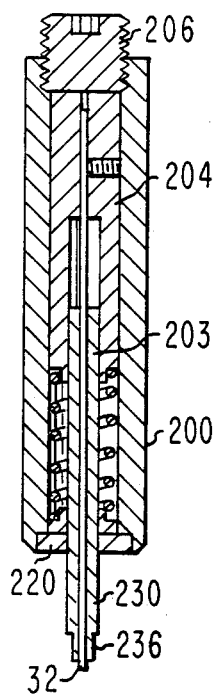
FIG. 5c is an enlarged cross sectional view of a portion of the magazine shown in FIG. 5b.
Figure 5C:
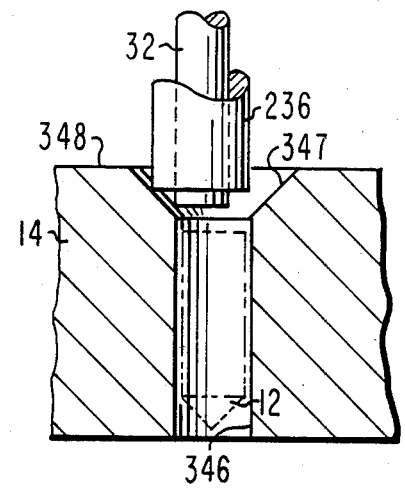
Figure 5A:
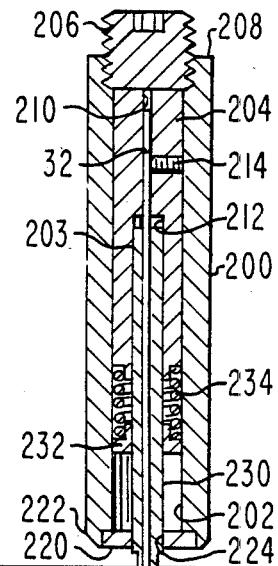
FIG. 5a is a cross sectional view of the stylus pusher assembly 28 prior to insertion of the push rod into the pocket of the magazine.
Figure 5B:
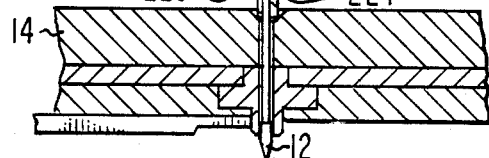
FIG. 5b is a view similar to that of FIG. 5a but showing the pushrod fully inserted into the pocket of the magazine and showing a cross sectional view of a portion of the magazine.
Figure 5B:
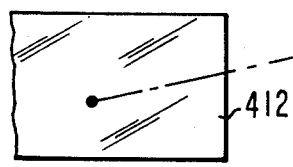

The magazine 14, as best seen in FIGS. 5b and 5c, has a series of pockets 346 formed equally spaced on a common radius adjacent the periphery. The pockets 346 are arranged so that each will hold a stylus 12 as shown in FIG. 5c. A resilient member, not shown, is utilized to apply a small side pressure to the stylus so that it is retained within the pocket unless pushed out by the push rod 32. The pockets 346 contain a countersink 347 in the top surface 348 of the magazine 14.

The indexing mechanism 30 is arranged to cause the magazine 14 to index so that each stylus pocket 346 containing a stylus 12, in turn, may be brought into alignment above the hole 80 of the collet 50, preparatory to pushing the stylus into the rotary collet. An indexing shaft 350, having a toothed ratchet wheel 352 keyed thereto, is journaled for rotation with respect to the mounting plate 22. The magazine 14 is locked in place by means of a nut 351 that is threaded onto the shaft 350. The magazine 14 is also keyed to the shaft 350 and rotates along with the ratchet wheel 352. The teeth 354 of the ratchet wheel 352 are of identical pitch to that of the stylus pockets 346 of the magazine 14. A suitable pawl mechanism 356 having an actuating lever 358 is arranged to index the ratchet wheel 352 a single tooth at a time. An air cylinder 360 is utilized to operate the actuating lever 358. When the air cylinder 360 is de-energized, the actuating lever 358 is returned by operation of a return spring, not shown. An anti-reverse spring 362 is utilized in the usual manner to prevent reversal of direction of rotation of the ratchet wheel 352. The ratchet and pawl mechanism has a small amount of play so that the rachet may pivot about the shaft 350 somewhat for a purpose to be explained below. The ratchet and pawl mechanism used herein is well known in the art and therefore will not be described further.

The laser assembly 24 includes a laser 400, which may be of the helium-xenon type, and suitable mounting brackets 402 for attaching the laser 400 to the mounting plate 22. The laser light beam 404 is directed to the tip of the stylus 12 by means of two mirrors 406 and 408 as shown in FIG. 2. A suitable shroud 410 is provided to enclose a substantial portion of the path taken by the light beam 404. When the stylus 12 is properly positioned within the rotary collet, the light beam 404 will be reflected by a flat surface formed on the tip of the stylus and directed to intersect a target 412. The target 412 comprises a ground glass screen having a reticle or other reference markings associated therewith. A suitable laser power supply, not shown, is housed within the base 20.

In operation a magazine 14 containing a full compliment of styli is loaded onto the indexing shaft 350 and locked in place by means of the lock nut 351. The air cylinder 49 is then energized which causes the rotary collet assembly 40 to move upwardly to the position indicated at B in FIG. 6. The arm 294 is manually manipulated to cause the fixture plate 280 to fully retract in the direction indicated by the arrow D shown in FIGS. 2 and 6. A stylus holder tube 16 is then manually placed into the V blocks 282 and secured. The arm 294 is again manually manipulated to cause the fixture plate 280 to move fully forward in the direction indicated by the arrow C shown in FIGS. 2 and 6. This causes the tip 16a of the stylus holder tube 16 to engage the seat 334 of the anvil 330, as seen in FIG. 6. As the fixture plate 280 moves forward, a linkage mechanism associated therewith also causes the arm 180 to be positioned in the approximate center of its range of movement.

The air cylinder 260 is then energized causing the stylus pusher assembly 28 to move downwardly as viewed in FIG. 3. As this movement continues the lower portion 236 of the sleeve 230 engages the countersink 347, as shown in FIG. 5c. Should the pocket 346 be slightly off center with respect to the sleeve 230, the camming action of the lower portion 236 on the surface of the countersink 347 will cause the magazine 14 to pivot a slight amount in a direction that tends to align the pocket on center with the sleeve. As downward movement of the pusher assembly 28 continues, the lower portion 236 seats in the counter-sink 347 preventing further downward movement of the sleeve. The push rod 32 continues downwardly, engaging the end of the stylus 12, pushing it out of the pocket and into the hole 80 of the collet 50, as shown in FIG. 5b. Note that the tip of the stylus projects below the jaws 87 of the collet 50.

The laser 400 is then caused to emit a beam of light 404 in a manner well known in the art. The beam of light 404 is directed to impinge upon the tip of the stylus 12. The arm 180 is then manually manipulated thereby rotating the stylus about its longitudinal axis while observing the ground glass target 412. Rotation of the stylus continues until the beam of light 404 reflects off the stylus tip and intercepts the target 412 at the reticle. The air cylinder 170 is then energized which applies pressure to the end 166 of the brake rod 158 which in turn locks the collet 50 against rotation and holds the stylus 12 firmly in place.

The air cylinder 42 is then de-energized and the rotary collet assembly 40 begins to move downwardly, under the action of a return spring, toward the position indicated at A in FIG. 6. As downward movement continues, the tip of the stylus 12 pierces the tip 16a of the stylus holder tube 16. Downward movement ceases when the rotary collet asembly 40 reaches the position as indicated at A in FIG. 6. The air cylinder 170 is then de-energized and the air cylinder 49 is energized thereby permitting the collet 50 to separate from the stylus 12 as the rotary collet assembly 40 returns to the position indicated at B in FIG. 6. The tip 16a of the stylus holder tube 16 is prevented from rising upwardly with the collet 50 by the overhanging edge 342 of the stripper plate 340. The air cylinder 360 is then momentarily energized to operate the indexing mechanism thereby rotating the magazine 14 to the next position.

The arm 294 is then manually manipulated to retract the fixture plate 280, the completed stylus holder tube and stylus assembly is then removed, another stylus holder tube is inserted, and the process is repeated.

It shall be understood that the novel features of the present invention permit highly accurate positioning of the extremely small stylus point and rapid and reliable assembly of the stylus to the stylus holder by a relatively unskilled operator.

I claim:

1. Apparatus for aligning and inserting an information-containing-disc stylus into a stylus holder comprising:
   (a) holder means for holding said stylus holder;
   (b) positioning means for positioning said stylus with respect to said stylus holder comprising: a stylus receiving chamber having a longitudinal axis arranged so that when said stylus is inserted into said stylus receiving chamber said longitudinal axis is coaxial with said stylus, said stylus receiving chamber being arranged to pivot about said longitudinal axis;
   (c) loading means for placing said stylus into said positioning means;
   (d) inserting means for inserting said stylus into said stylus holder; and
   (e) light beam means for indicating a desired position of said stylus with respect to said stylus holder.

2. The apparatus set forth in claim 1 wherein said stylus receiving chamber includes means for retaining said stylus within said receiving chamber.

3. The apparatus set forth in claim 2 wherein said stylus receiving chamber is a rotary collet having stylus gripping jaws and said means for retaining includes a resilient portion for causing said jaws to grip said stylus.

4. The apparatus set forth in claim 3 wherein said positioning means further comprises:
   (a) a base plate having said rotary collet journeled for rotation therein;
   (b) rotation means for manually rotating said rotary collet; and
   (c) locking means associated with said base plate for preventing said rotating of said rotary collet.

5. The apparatus set forth in claim 4 wherein said rotation means includes gear teeth formed on said rotary collet and a rack gear arranged in operational engagement with said gear teeth.

6. The apparatus set forth in claim 5 wherein said inserting means comprises means for imparting movement to said rotary collet and means for constraining said movement substantially parallel to said longitudinal axis of said chamber for a portion of said movement.

7. The apparatus set forth in claim 6 wherein said means for imparting movement to said rotary collet is a resilient member and said means for constraining said movement is a slide.

8. Apparatus for aligning and inserting an information-containing-disc stylus into a stylus holder comprising:
(A) holder means for holding said stylus holder;
(B) positioning means for positioning said stylus with respect to said stylus holder;
(C) loading means for placing said stylus into said positioning means comprising:
   (a) a magazine having stylus containing pockets, each said pocket having a countersink;
   (b) a push rod arranged vertically above and in substantial alignment with one of said pockets, said push rod further arranged to undergo vertical movement along its longitudinal axis in an upward and a downward direction; and
   (c) a sleeve, being in a first position with respect to said push rod, arranged to move along therewith for a portion of said vertical movement of said push rod whereby when said push rod is caused to move downwardly said sleeve engages said countersink of said pocket causing said magazine to rotate until said pocket is in alignment with said push rod;
(D) inserting means for inserting said stylus into said stylus holder; and
(E) light beam means for indicating a desired position of said stylus with respect to said stylus holder.

9. The apparatus set forth in claim 8 wherein said sleeve and said push rod are coaxial.

10. The apparatus set forth in claim 9 including a resilient member arranged to urge said sleeve into said first position.

* * * * *